Dec. 1, 1931. W. W. HANCOCK 1,834,615
WINDSHIELD WIPER
Filed Feb. 25, 1929
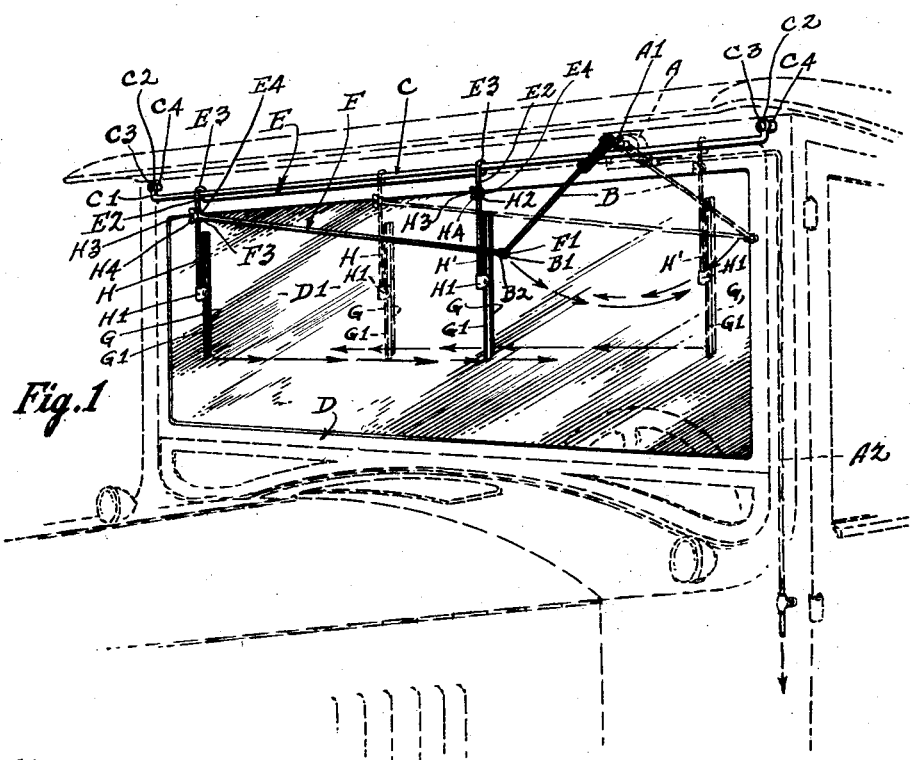
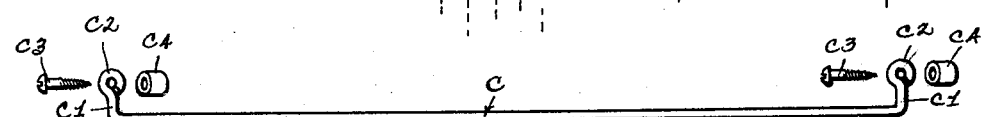
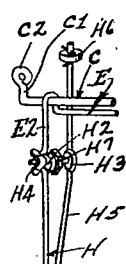
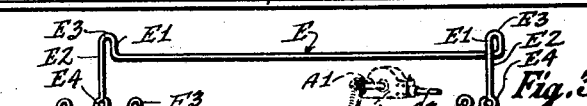
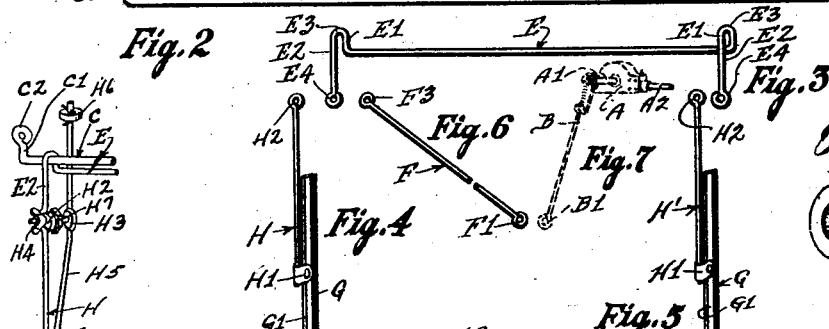
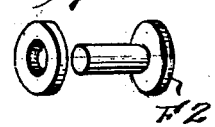
INVENTOR.
William W. Hancock,
BY
ATTORNEY.

Patented Dec. 1, 1931

1,834,615

UNITED STATES PATENT OFFICE

WILLIAM W. HANCOCK, OF LOS ANGELES, CALIFORNIA, ASSIGNOR OF FIFTY-ONE ONE-HUNDREDTHS TO EDWARD WESTBERG, OF GLENDALE, CALIFORNIA

WINDSHIELD WIPER

Application filed February 25, 1929. Serial No. 342,509.

This invention relates to windshield wipers, and the main object is to provide a vacuum or electrically operated device embodying a pair of wipers commonly operated in such a manner that they will traverse substantially the full length of a windshield of a motor car instead of the relatively small sector of a windshield usually cleaned by the oscillating type of wiper.

An important object is to provide a simple, economical, and efficient device capable of being attached to the usual vacuum or electric motors employed for operating the oscillating type of single wiper, whereby the windshield cleaning device may be converted from a single wiper of the oscillating type to a double reciprocating type for more effectively cleaning a glass shield without changing the motor or substituting complicated mechanism therefor.

In the drawings,

Fig. 1 is a perspective view of my improved windshield wiper shown in connection with the windshield of a motor car.

Fig. 2 is a view of a supporting member with associated parts shown detached therefrom and adapted to be supported on the upper bar of the windshield for guiding the wipers in their movement.

Fig. 3 is a front view of a sliding member operatively held on the supporting member shown in Fig. 2.

Figs. 4 and 5 are similar perspective views of the wipers and wiper arms adapted to be adjustably attached to the sliding member shown in Fig. 3.

Fig. 6 is a view of a link for operatively connecting the oscillating arm of the motor with the member shown in Fig. 3.

Fig. 7 is a perspective view of a vacuum or electric motor for operating the device, not a part of my invention.

Fig. 8 is a perspective view of an adjustment device for adjustably connecting the wiper arms with the common slidable member.

Fig. 9 shows a pivot connection for attaching the link shown in Fig. 6 to the arm shown in Fig. 7.

Fig. 10 shows a modified form of the wiper arm illustrated in Fig. 4.

It will be understood that the windshield wipers now in vogue usually embody a vacuum or electric motor A arranged with a projecting shaft A1 to which is suitably attached an oscillating arm B by means of which a wiper blade, as at G, may be moved backwardly and forwardly in an arcuate path over a portion of the glass D1 of the windshield D. The motor A is usually attached to the upper bar of the windshield frame D and if vacuum operated has a pipe A2 leading therefrom, adapted to be connected with the intake manifold or other portion of the motor for operating the motor A.

In order to increase the efficiency of the windshield wiper without substantially increasing the cost thereof, or adding complicated and expensive parts, I have provided means whereby the usual single wiper may be detached from the arm B of the motor A and the same or another arm applied to the shaft A1 of the motor in lieu of the arm B. To this end I provide a horizontal rod C, which has upwardly bent end portions C1, C1 terminating in eyes C2, C2. Screws C3, C3 are extended through the eyes C2, C2 and spacing sleeves C4, C4, and are attached to the upper bar of the windshield frame D, as shown in Fig. 1.

The rod C is rigidly held in position with the body thereof horizontally disposed below the operating shaft A1 of the motor A and spaced from the windshield frame D.

An elongated rod E is provided, which is bent upwardly at each end, as at E1, and thence downwardly at E2 so as to form a loop E3 at each end of the member E. An eye E4 is formed at the end of each of the portions E2, as shown in Fig. 3. The loops E3, E3, as shown in Fig. 1, overlie and are slidable upon the rod C. A link F operatively connects the motor arm B with the remote eye E4 of the member E. Said member F has eyes F1 and F3 at its opposite ends which overlie the eyes B1 and E4 of the members B and E respectively.

The members B and F may be permanently connected together at their eyes B1 and F1 by means of a rivet F2. The eye F3 of member F and the eye E4 of member E are detachably connected by means of a screw H3 having a wing nut H4 thereon. The screw H3 extends through the eyes F3 and E4 and also through the eye H2 of a wiper arm H, which overlies the eye F3 of member F. The nut H4 is adjustably held externally of the eye H2.

A similar wiper arm H' overlies the eye E4 at the other end of member E and is adjustably connected therewith by means of a screw H3 and a nut H4. Each of the arms H and H' carries a wiper G mounted in a metallic holder G1 and supported on the depending end of the arm in each case by means of a metal clip H1. The two arms H and H' and their wipers G, G are spaced apart lengthwise of the windshield D1 so that the portions of the windshield traversed by the two arms will overlap, and thus the two arms will be effective for cleaning substantially the entire length of the glass. The adjustment of the arms H and H' by means of the screws H3 and nuts H4 permits the said arms and their wipers G, G to be swung upwardly into horizontal position at the top of the windshield when the device is not in operation, so as not to obscure the vision of the occupants of the car.

I have found that the members C, E, F, H, and H' may be made of round Bessemer steel or other metal rod of approximately 1/8" in diameter, or less, and when so constructed provides a sufficiently rigid device of light weight and low cost. It is obvious that the attachment of the additional wiper, the supporting member C, the slidable member E, and the link F may be made by unskilled persons without detaching the motor A or without substituting a new motor therefor.

The member H may be modified in form as shown in Fig. 10, wherein said member has an upwardly bent extension H5 with a roller H6 on the end thereof for engagement with the glass of the windshield. In such a form the screw H3 may have a lock nut H7 engaging the rear side of the eye H2 of member H while the head of the screw bears against the extension H5, as shown, for providing a tension on members H, H' and E so that the wipers G, G will frictionally engage the glass during the operation of the device.

Altho the device is shown in its preferred form, I may otherwise modify the structure within the scope of the appended claims without departing from the spirit of my invention.

What I claim is:

1. In a windshield wiper, a motor, an oscillatable arm connected with said motor, a guide rod supported parallel with and on top of a windshield, a slide reciprocably mounted thereon and having arms depending from its ends said arms being formed at their junctions with said guide rod to provide bearings, wipers carried on said arms for engagement with the windshield, and means for connecting one of said arms of said slide with the arm on said motor for reciprocating said slide and wipers lengthwise of the windshield.

2. In a windshield wiper, a motor, an arm fixed to the motor shaft to oscillate over the front of a windshield, a guide rod supported parallel with and on the top of the windshield and mounted below said motor shaft, a slide reciprocably held on said rod at spaced points and having arms depending therefrom at the ends, a wiper on each of said arms engaging the windshield, and a link pivotally connecting the arm on said motor with the remotest of the two wiper arms for simultaneously reciprocating said slide and wipers lengthwise of the windshield to correspond to the oscillation of said motor arm.

3. A windshield wiper comprising a stationary guide rod, a motor having an oscillatable arm extended therefrom, a slide rod having a horizontal body bent at spaced points to form bearings for engagement with said guide rod and having arms depending from said bearings, said arms having eyes formed at their ends, a pair of wipers having supporting arms, means for adjustably attaching the supporting arms of the wipers to the eyes of said slide arms, and means for connecting said oscillatable arm with one of the arms of said slide for commonly reciprocating said wipers.

WILLIAM W. HANCOCK.